United States Patent
Kumagai et al.

(10) Patent No.: US 8,383,743 B2
(45) Date of Patent: Feb. 26, 2013

(54) INK COMPOSITION FOR JET PRINTER

(75) Inventors: Akio Kumagai, Okegawa (JP);
Hiromichi Arakawa, Tokyo (JP);
Shigehiro Tanaka, Konosu (JP);
Kazuhiro Kaneko, Osaka (JP);
Yoshinosuke Shimamura, Ageo (JP)

(73) Assignee: Dainippon Ink and Chemicals, Inc., Tokyo (JP)

( * ) Notice: Subject to any disclaimer, the term of this patent is extended or adjusted under 35 U.S.C. 154(b) by 124 days.

(21) Appl. No.: 11/910,216

(22) PCT Filed: Mar. 30, 2006

(86) PCT No.: PCT/JP2006/306653
§ 371 (c)(1),
(2), (4) Date: Sep. 28, 2007

(87) PCT Pub. No.: WO2006/106821
PCT Pub. Date: Oct. 12, 2006

(65) Prior Publication Data
US 2009/0130405 A1    May 21, 2009

(30) Foreign Application Priority Data

Mar. 30, 2005    (JP) .................. 2005-097863

(51) Int. Cl.
*C08F 22/40* (2006.01)

(52) U.S. Cl. ......... 526/262; 52/309.1; 52/518; 526/258; 526/259; 526/263; 526/280; 526/281; 526/310; 526/312; 528/423; 528/479; 548/452

(58) Field of Classification Search ................. 52/309.1, 52/518; 526/258, 259, 262, 263, 280, 281, 526/310, 312; 528/423, 479; 548/452
See application file for complete search history.

(56) References Cited

U.S. PATENT DOCUMENTS 5,213,613 A    5/1993    Nagashima et al.

FOREIGN PATENT DOCUMENTS

| JP | 5-86315 A | | 4/1993 |
|----|---|---|---|
| JP | 10-278497 A | | 10/1998 |
| JP | 10278497 A | * | 10/1998 |
| JP | 11-209625 A | | 8/1999 |
| JP | 2000053906 A | * | 2/2000 |
| JP | 2000-327724 A | | 11/2000 |
| JP | 2000-335085 A | | 12/2000 |
| JP | 2001-121078 A | | 5/2001 |
| JP | 2001121078 A | * | 5/2001 |
| JP | 2001-172336 A | | 6/2001 |
| JP | 2001172336 A | * | 6/2001 |
| JP | 2002053604 A | * | 2/2002 |
| JP | 2003-1749 A | | 1/2003 |
| JP | 2004027020 A | * | 1/2004 |
| JP | 2004-339355 A | | 12/2004 |
| JP | 2004339355 A | * | 12/2004 |
| JP | 2004339367 A | * | 12/2004 |

OTHER PUBLICATIONS

International Search Report of PCT/JP2006/306653, date of mailing Jun. 27, 2006.
Supplementary European Search Report dated Jun. 18, 2010, issued in corresponding European Patent Application No. 06730601.9.

* cited by examiner

*Primary Examiner* — Richard A Huhn
(74) *Attorney, Agent, or Firm* — Westerman, Hattori, Daniels & Adrian, LLP

(57) ABSTRACT

Disclosed is an ink composition for jet printer, comprising a pigment, a film forming resin and an organic solvent, the film forming resin being an acrylic copolymer containing, as a monomer unit, at least one of compounds represented by the general formulas (1) and (2):

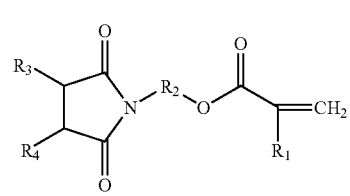

(1)

wherein $R_1$ represents a hydrogen atom or a methyl group; $R_2$ represents an alkylene group having 2 to 12 carbon atoms which may be linear or branched; and $R_3$ and $R_4$ each independently represents a hydrogen atom, an alkyl group, an alkenyl group or an aryl group, and the sum of the number of carbon atoms of $R_3$ and $R_4$ is from 4 to 12, or $R_3$ and $R_4$ form a saturated or unsaturated hydrocarbon group which is a five-membered ring formed by combination of the $R_3$ and $R_4$; and

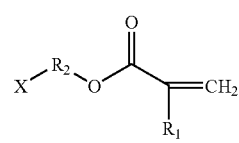

(2)

wherein $R_1$ represents a hydrogen atom or a methyl group; $R_2$ represents an alkylene group having 2 to 12 carbon atoms which may be linear or branched; and X represents a group selected from the group consisting of groups represented by the general formulas (3) to (9).

18 Claims, No Drawings

INK COMPOSITION FOR JET PRINTER

TECHNICAL FIELD

The present invention relates to an ink for jet printer, which is suited for forming a pattern having enhanced design properties on a siding material for outer wall using an ink jet system.

Furthermore, the present invention relates to a method for producing a siding material for outer wall in which a pattern is formed using an ink jet system, and a siding material for outer wall produced by the method.

BACKGROUND ART

A gravure printing or roll coating method has conventionally been used so as to form a pattern on a siding material for outer wall (see Japanese Unexamined Patent Application, First Publication No. 2001-121078 and Japanese Unexamined Patent Application, First Publication No. 2003-001749). However, since an expensive printing plate is used in a gravure printing method, a pattern cannot be easily replaced and it was difficult to change or modify the pattern. Also, according to the gravure printing or roll coating method, a pattern can be printed only on a flat surface and it was difficult to achieve a pattern having three-dimensional impression.

Therefore, it was proposed to print using an ink jet system (see Japanese Unexamined Patent Application, First Publication No. Hei 10-278497). In the case of printing using the ink jet system, a drawing pattern can be freely and easily changed on demand and also printing can be carried out even if the printing surface has irregularity, and thus a drawing pattern having three dimensional impression can be provided.

However, characteristics required to the ink jet ink used in the siding for outer wall includes, in addition to characteristics required in a conventional ink jet ink, high weatherability which prevents fading even when exposed to sunlight, and physical strength such as adhesion with a substrate as a base, an undercoating layer, or a clear layer to be overcoated so as to protect the printed portion.

As a jet printing ink capable of forming an image on a non-absorbable material to be recorded such as siding material, for example, an ink prepared by dissolving or dispersing a coloring agent in a mixed solution of a resin and a solvent has conventionally been used.

The coloring agent includes dye-based and pigment-based coloring agents and a dye-based coloring agent is commonly excellent in dispersibility and color developability, but is likely to cause fading. Therefore, in colorfastness and weatherability, the pigment-based coloring agent is considered to be advantageous. Therefore, a pigment-based coloring agent (pigment), which is insufficient in stable dispersion but is excellent in light resistance, is generally used for outer wall siding.

As the film forming resin component of the ink composition for jet printer, various resins such as polyester resin, vinyl chloride-vinyl acetate copolymer resin, ethylene vinyl acetate copolymer resin, polyurethane resin, acrylic resin, styrene-acrylic resin, polyvinyl butyral resin, rosin-modified maleic acid resin, nitrocellulose and phenol resin are used alone or in combination.

However, in the case of a conventional ink composition for jet printer using these pigments and resins, when a wall material having a drawing pattern formed thereon using them is used as an outer wall material, the drawing pattern was inferior in weatherability and durability. Therefore, a conventional ink composition was not suited for use in the outer wall.

As described above, there has never been put an ink composition for jet printer, in which a pigment in an ink is sufficiently in the form of fine particles and stably dispersed to the degree which enables ink jet recording and also, when a pattern for outer wall is formed using this ink, the pattern has excellent weatherability and durability, into practical use.

DISCLOSURE OF THE INVENTION

An object of the present invention is to provide an ink composition for jet printer, which has stable dispersion stability and good ejection properties suited for use as an ink for jet printer, and also has sufficient weatherability and durability when used to form a pattern of a siding material for outer wall.

Further, another object the present invention is to provide a method for producing a siding for outer wall having excellent light resistance and durability, which can easily form a decorative pattern even on the siding surface having irregularity.

Still Furthermore, another object to be achieved by the present invention is to provide a siding for outer wall produced by the above method, which has a decorative pattern formed on the surface and has excellent light resistance and durability.

The present inventors have selected a film forming resin, a coloring agent, a dispersing agent, a solvent and the like so as to obtain an ink which has characteristics suited for use as an ink for ink jet recording and also can be used for outer wall requiring light resistance and durability, and intensively studied. As a result, they have found that a jet printing ink, which contains, as a film forming resin, an acrylic copolymer containing imide (meth)acrylate having a specific cyclic imide group as a monomer unit, and also contains a pigment-based coloring agent as a coloring agent, has characteristics suited for used as an ink for ink jet recording, and also when used for outer wall as a siding material having a pattern formed thereon using the ink, the pattern formed using the ink can provide sufficient light resistance and durability. Thus, the present invention has been completed.

Namely, the present invention provides an ink composition for jet printer, comprising a pigment, a film forming resin and an organic solvent, the film forming resin being an acrylic copolymer containing, as a monomer unit, at least one of compounds represented by the general formulas (1) and (2):

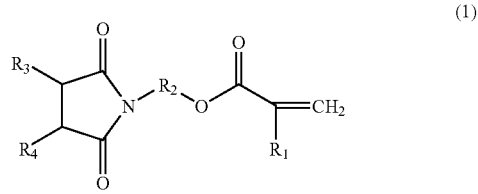

(1)

wherein $R_1$ represents a hydrogen atom or a methyl group; $R_2$ represents an alkylene group having 2 to 12 carbon atoms which may be linear or branched; and $R_3$ and $R_4$ each independently represents a hydrogen atom, an alkyl group, an alkenyl group or an aryl group, and the sum of the number of carbon atoms of $R_3$ and $R_4$ is from 4 to 12, or $R_3$ and $R_4$ form a saturated or unsaturated hydrocarbon group which is a five-membered ring formed by combination of the $R_3$ and $R_4$;

(2)

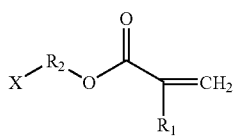

wherein $R_1$ represents a hydrogen atom or a methyl group; $R_2$ represents an alkylene group having 2 to 12 carbon atoms which may be linear or branched; and X represents a group selected from the group consisting of groups represented by the general formulas (3) to (9); and (3)

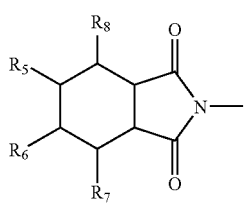

(4)

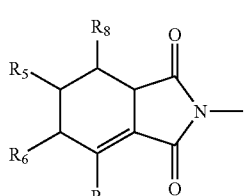

(5)

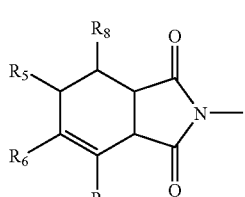

(6)

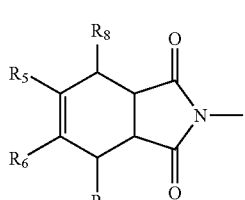

(7)

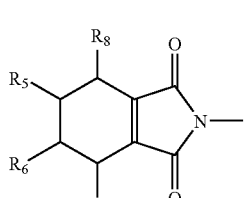

(8)

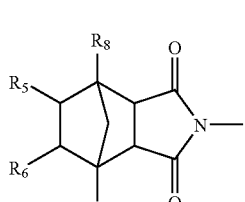

-continued (9)

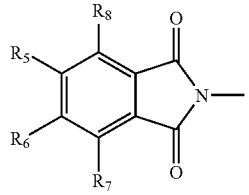

wherein $R_5$, $R_6$, $R_7$ and $R_8$ represent a hydrogen atom or an alkyl group having 1 to 6 carbon atoms.

Furthermore, the present invention provides a siding for outer wall comprising a base material for siding, and an undercoating layer, an ink jet ink coating layer and a surface protective layer laminated in this order on the base material for siding, wherein the ink jet ink coating layer is formed using the above ink composition for jet printer.

Furthermore, the present invention provides a method for producing a siding for outer wall, which comprises forming an undercoating layer on the entire surface of a base material for siding, forming a ink jet ink coating layer at an arbitrary position on the undercoating layer using an ink jet system, and forming a surface protective layer on the entire surface, wherein the ink jet ink coating layer is formed using the above ink composition for jet printer.

The ink composition for jet printer of the present invention contains, as a film forming component, an acrylic copolymer containing imide (meth)acrylate having a cyclic imide group as a monomer unit, and also uses a pigment as a coloring agent. Therefore, using an ink jet system, printing can be easily carried out on an outer wall material such as PCM (pre-coated metal) steel plate for outer wall, which has irregularity on the surface. Also, a siding outer wall having excellent durability and weatherability can be provided by strongly bonding the ink composition with an outer wall material or an undercoating layer formed on the outer wall material.

According to the method for producing a siding for outer wall of the present invention, an undercoating layer formed on the surface of a base material for siding is preferably formed on the entire surface of the base material, a ink jet ink coating layer is preferably formed at an arbitrary position on the undercoating layer using an ink composition for jet printer having the above composition, and then a surface protective layer is preferably formed on the entire surface. Therefore, it is possible to produce an excellent design siding for outer wall, which is excellent in durability and light resistance and also has an excellent fine pattern formed thereon.

BEST MODE FOR CARRYING OUT THE INVENTION

The jet printing ink of the present invention can be prepared from a pigment dispersion liquid containing a film forming resin, a pigment and an organic solvent.

The film forming resin used in the present invention is an acrylic copolymer obtained by copolymerizing an imide (meth)acrylate having a specific cyclic imide group and, if necessary, the other monomer.

Examples of the imide (meth)acrylate having a cyclic imide group as the monomer unit contained in the acrylic copolymer includes compounds represented by the general formulas (1) and (2):

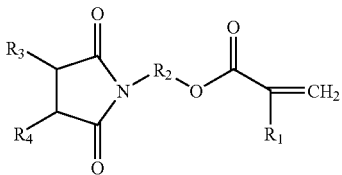
(1)

wherein $R_1$ represents a hydrogen atom or a methyl group; $R_2$ represents an alkylene group having 2 to 12 carbon atoms which may be linear or branched; and $R_3$ and $R_4$ each independently represents a hydrogen atom, an alkyl group, an alkenyl group or an aryl group, and the sum of the number of carbon atoms of $R_3$ and $R_4$ is from 4 to 12, or $R_3$ and $R_4$ form a saturated or unsaturated hydrocarbon group which is a five-membered ring formed by combination of the $R_3$ and $R_4$;

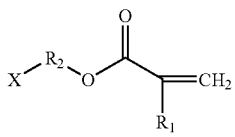
(2)

wherein $R_1$ represents a hydrogen atom or a methyl group; $R_2$ represents an alkylene group having 2 to 12 carbon atoms which may be linear or branched; and X represents a group selected from the group consisting of groups represented by the general formulas (3) to (9); and

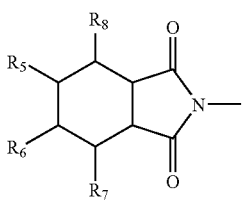
(3)

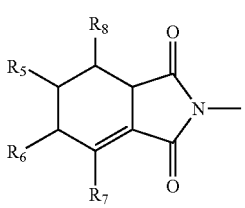
(4)

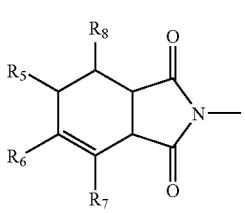
(5)

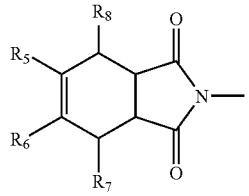
(6)

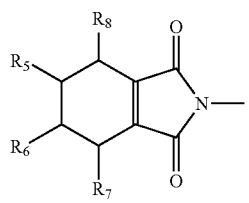
(7)

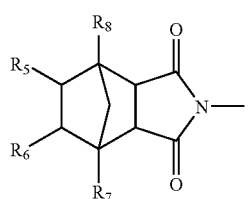
(8)

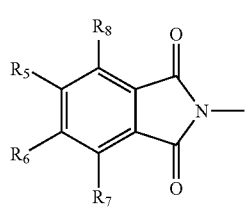
(9)

wherein $R_5$, $R_6$, $R_7$ and $R_8$ represent a hydrogen atom or an alkyl group having 1 to 6 carbon atoms.

Among compounds represented by the general formulas (1) and (2), the compound represented by the general formula (2) is preferable. $R_2$ preferably has 2 to 4 carbon atoms. $R_3$ and $R_4$ each independently represents a hydrogen atom, alkyl group, alkenyl group, or an aryl group, and the sum of the number of carbon atoms of $R_3$ and $R_4$ is preferably from 6 to 10. X is preferably a group represented by the formula (3) because it has good light resistance. Furthermore, $R_5$, $R_6$, $R_7$ and $R_8$ preferably represent a hydrogen atom or a methyl group.

The compound represented by the general formula (1) or (2) of the present invention may be used alone, or two or more kinds of them may be used in combination.

An imide (meth)acrylate having a cyclic imide group represented by the general formula (2) is preferably a hexahydrophthalimidealkyl (meth)acrylate such as hexahydrophthalimideethyl acrylate (ALLONIX M-140 manufactured by Toa Gosei Co., Ltd.) or hexahydrophthalimide propylene acrylate, or tetrahydrophthalimidealkyl (meth)acrylate such as tetrahydrophthalimideethyl acrylate, and most preferably hexahydrophthalimideethyl acrylate (Allonix M-140 manufactured by Toa Gosei Co., Ltd.).

The method for synthesizing imide (meth)acrylate is disclosed, for example, in the following known documents: Kiyoshi KATO et al., Journal of The Synthetic Organic Chemistry, Japan 30(10), 897, (1972), Javier de Abajo et al., Polymer, vol 33(5), (1992), Japanese Unexamined Patent Application, First Publication No. Sho 56-53119, Japanese Unexamined Patent Application, First Publication No. Hei 1-242569, and Japanese Unexamined Patent Application, First Publication No. 2001-172336.

By using an acrylic copolymer having a cyclic imide group as a film constituent component of a jet printing ink, wettability of a pigment with a resin is improved, and therefore dispersion stability of the pigment is improved. Since adhesion between an ink, an undercoating layer used as a base and a surface protective layer used for overcoating is improved, it is possible to realize adhesion between a PCM steel plate and an ink, and adhesion between an ink and a clear agent used for overcoating.

The other monomer, which is copolymerized with phthalimide (meth)acrylate having a cyclic imide group, is not specifically limited and it is possible to use known and arbitrary copolymerizable monomer.

Examples of the other monomer include an alkyl ester (meth)acrylate such as methyl (meth)acrylate, ethyl (meth)acrylate, propyl (methacrylate, (meth)acrylate, ethylhexyl (meth)acrylate, or lauryl (meth)acrylate, and the alkyl group may be branched or linear.

Examples of the other monomer further includes an alicyclic alkyl (meth)acrylate such as isobornyl (meth)acrylate or cyclohexyl (meth)acrylate; a substituted aryl (meth)acrylate such as benzyl (meth)acrylate; an alkoxy (meth)acrylate such as 2-methoxyethyl (meth)acrylate or 2-ethoxyethyl (meth)acrylate; a hydroxyalkyl acrylate such as (meth)acrylic acid or 2-hydroxyethyl (meth)acrylate; and alkoxysilyl group-containing (meth)acrylate, styrene, acrylonitrile, and a-methylstyrene. These monomers can be used alone or in combination.

The mass content of the imide (meth)acrylate monomer unit having a cyclic imide group in the acrylic copolymer used in the present invention can be optionally selected in the present invention. For example, the content is preferably from 10 to 50% by mass, and more preferably from 15 to 45% by mass, because adhesion between a resin coating film used as the undercoating layer and an ink is improved and also adhesion between an ink and a surface protective layer used for overcoating is improved. When the content is 10% or more, good characteristics such as pigment dispersibility, and good boiling water resistance as durability of printing images in boiling water are obtained. When the content is controlled to 50% or less, it is possible to maintain good balance between pigment dispersibility and adhesion including boiling water resistance.

A glass transition point (Tg) of the acrylic copolymer containing an imide (meth)acrylate unit having a cyclic imide group monomer in the mass content within a range from 10 to 50% is not specifically limited, but Tg is preferably low in view of adhesion with the substrate and boiling water resistance. For example, Tg is preferably from 40 to −10° C.

The content of the acrylic copolymer in the ink composition of the present invention can be selected, if necessary. For example, the content of the acrylic copolymer is preferably from 1 to 30% by mass, and more preferably from 5 to 20% by mass, based on the total amount of the ink composition. A molecular weight of the acrylic copolymer can be selected preferably. A molecular weight thereof is preferably from 5,000 to 300,000, and more preferably from 10,000 to 60,000, in terms of a weight average molecular weight. Also, physical properties of the ink composition of the present application can be selected, if necessary. For example, viscosity of the ink composition is preferably from 2 to 20 mPa·s, and more preferably from 6 to 14 mPa·s. Surface tension of the ink composition is preferably from 20 to 40 dyn/cm, and more preferably from 25 to 35 dyn/cm.

The coloring agent used in the jet printing ink includes, for example, a dye, an organic pigment and an inorganic pigment. The pigment used in the present invention can be optionally selected, but is preferably an inorganic pigment because weatherability and durability are required for application of a jet printing ink used in a siding material for outer wall.

Specific examples of the inorganic pigment include carbon black such as furnace black, channel black, thermal black, or acetylene black; black iron oxide, yellow iron oxide, red iron oxide, ultramarine blue, iron blue, and titanium oxide (rutile type and anatase type). It is also possible to use a pigment having strong light resistance such as phthalocyanine blue among organic pigments.

In the present invention, these pigments may be used alone or in combination of two or more. The amount of the pigment used in the present invention can be selected, if necessary. The amount of the inorganic pigment is preferably from 10 to 90%, and more preferably from 15 to 80%, based on the solid content of the ink composition. The amount of the organic pigment is preferably from 5 to 80%, and still more preferably from 10 to 60%.

These pigments can be dispersed so as to obtain characteristics suited for use as a jet printing ink according to characteristics of each pigment, using a dispersing agent such as an anionic, cationic or nonionic dispersing agent, a polymer-based dispersing agent or others (amphoteric compound, fluorine-containing compound, etc.) or a known arbitrary dispersing aid.

The organic solvent capable of dispersing these elements is not specifically limited and can be selected, if necessary. Examples of the organic solvent usable in the present invention include an alcohol-type solvent such as ethyl alcohol or isopropyl alcohol; a glycol-type solvent such as ethylene glycol monoethyl ether or propylene glycol monomethyl ether; an ester-type solvent such as ethyl acetate, butyl acetate, 3-methoxybutyl acetate, 3-methoxy-3-methylbutyl acetate, or propylene glycol monomethyl ether acetate; a ketone-type solvent such as methyl ethyl ketone, methyl isobutyl ketone, isophorone, or acetophenone; and a hydrocarbon-type solvent such as n-hexane, isooctane, n-noctane, methylcyclohexane, cyclopentane, toluene, or xylene.

By using these solvents alone or in combination, viscosity, surface tension and drying rate of the jet printing ink can be adjusted and thus the composition of the solvent of the jet printing ink suited for a base material to be printed and a jet printing ink printer can be provided.

A pigment dispersion liquid can be prepared from the above raw materials by the following procedure.

A pigment, an organic solvent and, if necessary, a dispersing agent is dispersed and mixed using a disperser such as dispersion stirrer, ball mill, atriter, sand mill, or beads mill. Then, the pigment is dispersed more finely using a device such as nano mill to obtain an ink base. To the ink base thus obtained, an acrylic copolymer, which is obtained by copolymerizing phthalimide (meth)acrylate having a cyclic imide group, and an organic solvent, is added, followed by mixing using a dispersion stirrer. Then, viscosity is adjusted with an organic solvent, followed by filtration through a 1 micron filter, and thus an ink composition for jet printer used for an outer wall siding material can be obtained.

It is possible to add, in addition to the above essential components in the present invention, additives, for example, an extender pigment for improving hiding properties such as silica powder, aluminum silicate, or calcium carbonate, an antisettling agent of a pigment, and a thickener for adjusting viscosity so as to improve hiding properties.

The siding for outer wall of the present invention can be produced, for example, by the following procedure. An undercoating layer is formed on the entire surface of a base material for siding, and an ink jet ink coating layer is formed thereon by an ink jet recording method using the ink composition for jet printer. Then, a surface protective layer is further formed thereon to obtain a siding for outer wall.

The base material for siding may be selected, if necessary. For example, it is possible to use a ceramics-based base material such as cement slate plate or calcium silicate plate, a plywood, and a lumber. It is also possible to use a metal plate made of aluminum or steel, or those obtained by forming irregularity such as brick shape, tile shape or woody pattern on the surface of the metal plate due to embossing, molding or the like. When the metal base material for siding is used, the surface temperature is likely to increase under an exterior environment and particularly excellent durability and weatherability are required to the jet ink coating layer, and thus the jet printing ink of the present invention can be used particularly preferably.

The undercoating layer can also be selected, if necessary. For example, the undercoating layer can be formed by applying a coating material comprising a urethane resin, a polyvinyl alcohol resin, an acrylic resin, a hydroxymethyl cellulose resin, an acrylic resin and/or polyamide and a solvent on the siding base material using spraying or various coaters and drying the coating material to form a film composed of the dry coating film.

As the metal base material for siding, those obtained by preliminarily forming various resin coating films as the undercoating layer on the metal base material can be used as a PCM coated plate. In this case, since the undercoating layer previously exists, the step of forming the undercoating layer may be omitted.

Specific PCM coated plate and the base material thereof which can be used in the present invention can be optionally selected. Examples of usable base material include a metal plate such as steel plate, titanium plate, copper plate, magnesium plate, or aluminum plate, or those obtained by coating these plates with metal or non-metal. Examples of those coated with metal include a steel plate obtained by metal spraying on the surface, and a steel plate obtained by plating of metal. Also, plating and metal spraying in which an inorganic or organic matter is dispersed in metal can be included in said examples. It is preferred to use, among the above metallic material plates, a metallic material plate obtained by coating the surface with zinc, an alloy of zinc and other metals and/or a zinc compound, a steel plate obtained by metal spraying or plating of zinc on the surface, a steel plate obtained by further subjecting to a treatment capable of forming an inorganic coating film such as chromate treatment or zinc phosphate treatment, and a metal plate such as aluminum plate, steel plate, GALVANIUM made of an aluminum (55%) alloy, and GALFAN made of an aluminum (5%) alloy. It is possible to use a PCM coated plate obtained by precoating a metal plate, which can be the aforementioned base material, with a resin composition containing an isophthalic acid type polyester/melamine, a resin composition containing vinylidene fluoride/acrylic/melamine/bisphenol A type epoxy, or a resin composition containing terephthalic acid type polyester/melamine/bisphenol A type epoxy.

The back surface portion of the PCM coated plate may be composed of, for example, a resin foam made of a phenol-based resin, a polyurethane-based resin or the like, or a back surface material such as an aluminum laminate kraft paper comprising an inorganic material such as gypsum board as a core material, so as to impart soundproofing properties and heat insulating properties.

On the undercoating layer thus formed, a pattern can be printed using ink composition for ink jet printer of the present invention to form an jet ink coating layer.

A clear coating agent for forming surface protective layer which is overcoated on the jet ink coating layer can be optionally selected. Examples of a water-based clear coating agent include silicone acrylic emulsion-based and acrylic emulsion-based coating agents, and examples of a solvent-based coating agent include acrylic, acrylic urethane-based and fluorine-containing clear coating agents. These clear coating agents can be coated on the jet ink coating layer using a spray or various coaters.

EXAMPLES

The present invention will now be described in detail by way of Examples. However, the present invention is not limited to only these examples. In the following examples, parts are by weight.

<Synthesis Example of Phthalimide Acrylate>

In a reaction vessel equipped with a stirrer, a condenser tube, a water extractor and a nitrogen introducing tube, 166.2 pats (1 mol) of a methyltetrahydrophthalic anhydride compound (3 or 4-methyl-1,2,3,6-tetrahydrophthalic anhydride: RIKACID MT-500TZ manufactured by New Japan Chemical Co., Ltd.) and 310 parts of toluene were charged and 75 parts (1 mol) of n-propanolamine was added dropwise over 30 minutes. After heating to 90° C. and further heating gradually to within a range from 115 to 125° C., a reflux temperature was maintained for 3 to 4 hours. When an acid value thereof became 1 or less, the mixture was cooled, and then, 72 parts (1 mol) of acrylic acid, 0.16 parts of hydroquinone and 8.5 parts of concentrated sulfuric acid were added. After heating again and maintaining at 115 to 125° C. (reflux temperature) for 4 hours, the dehydration reaction was carried out. The reaction solution was cooled, transferred to a separately funnel, extracted once with 60 g of water and then extracted once with 200 g of an aqueous 20% NaOH solution. The solvent included in the resulting organic layer was distilled off from the organic layer to obtain 282 parts of a pale yellow liquid. The results of $^1$H-NMR and GPC of the liquid revealed that the following compound <MTIA> (methyltetrahydrophthalimideethyl acrylate) is obtained.

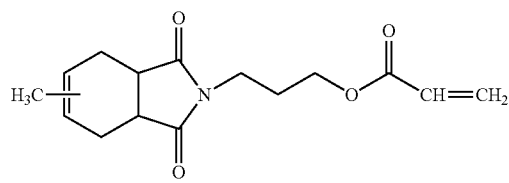

<Synthesis of Acrylic Copolymer>

Synthesis of Acrylic Copolymer A

In a reaction vessel equipped with a stirrer, a capacitor, a monomer tank, an initiator tank, a nitrogen introducing tube, a pump for a monomer and a pump for an initiator, a solvent (methoacetate) was previously charged in a reaction vessel in the amount shown in Table 1. Constituent monomers A shown in Table 1 were charged in a monomer tank in each amount (parts by weight) and also an initiator was charged in the initiator tank. The temperature in the reaction vessel was maintained at 95° C. and then the monomers and the initiator were added dropwise over 3 hours. After the completion of the dropwise addition, the mixture was heated to 105° C. over about 2 hours, maintained at 105° C. for 2 hours and then heated to 115° C. After the completion of the reaction at 115° C. for 1.5 hours, the reaction solution was cooled and then NV (nonvolatile content) and viscosity thereof were measured. In the same manner, an acrylic copolymer was synthesized according to the formulation shown in Table 1 to obtain copolymer acrylic resins A to E having propertied described in the column of physical properties of the reaction product shown in Table 1.

TABLE 1

| | Parts by weight | A | B | C | D | E |
|---|---|---|---|---|---|---|
| Solvent | Methoacetate (3-methoxybutyl acetate) | 100 | 100 | 100 | 100 | 100 |
| Monomer | MMA | 24 | 25.5 | 8.0 | 25.5 | 20.0 |
| | ARONIX M140 (Imide acrylate) | 40 | 30 | 10.0 | | |
| | MTIA (Imide acrylate) | | | | 30.0 | |
| | Cyclohexyl methacrylate BG8250 | | 0 | 20.0 | 0.0 | 50.0 |
| | β hydroxyethyl methacrylate | 10 | 10 | 9.0 | 10.0 | 10.0 |
| | Methacrylic acid | 0.0 | 1.5 | 3.0 | 1.5 | |
| | nBA | 0 | 8 | 20.0 | 8.0 | |
| | 2EHA | 25 | 25 | 30.0 | 25.0 | 19.0 |
| | KAYAMER PM21 | 1 | 0 | 0.0 | 0.0 | 1.0 |
| Polymerization initiator | NOFMER MSD | 1 | 1 | 1.0 | 1.0 | |
| | PERBUTYL I | 1.5 | 1.5 | 1.0 | 1.0 | 3.0 |
| | PERBUTYL O | 1.5 | 1.5 | 1.5 | 1.5 | 3.0 |
| | Sum total | 204.0 | 204.0 | 203.5 | 203.5 | 208.0 |
| | Solid content | 104.0 | 104.0 | 103.5 | 103.5 | 108.0 |
| | Total of monomers | 100.0 | 100.0 | 100.0 | 100.0 | 100.0 |
| Properties of reaction product | Appearance | Pale yellow transparent liquid | Pale yellow transparent liquid | Pale yellow transparent liquid | Pale yellow transparent liquid | Colorless transparent liquid |
| | Viscosity | +X | V | −V | −V | X-Y |
| | NV | 51.5 | 50.7 | 50.8 | 51.8 | 51.7 |

MMA: Methyl methacrylate

ARONIX M140: 2-(1,2-cyclohexanedicarboxyimide)ethyl acrylate (manufactured by Toa Gosei Co., Ltd.)

MTIA: Methyltetrahydrophthalimideethyl acrylate nBA: Butyl acrylate

2EHA: 2 ethylhexyl acrylate

KAYAMER PM21: e-caprolactone-modified phosphoric acid acrylate manufactured by Nippon Kayaku Co., Ltd.

NOFMER MSD: a-methylstyrene dimer

PERBUTYL I: Thermopolymerization initiator manufactured by NOF CORPORATION

PERBUTYL O: Thermopolymerization initiator manufactured by NOF CORPORATION

Viscosity (Gardner viscosity): value measured at 25° C. by Gardner Bubble Viscometer Appearance: visually observed under room light NV: Non-volatile content, weights were measured before and after drying using a ventilation drying oven at 150° C. for 30 minutes and a non-volatile content was calculated.

Example 1

| | |
|---|---|
| 100ED | 34.0 Parts |
| (magenta pigment manufactured by TODA PIGMENT CORP.) | |
| ADISPER PB-821 | 10.0 Parts |
| (dispersing agent manufactured by Ajinomoto Fine-Techno Co., Inc.) | |
| PMA | 56.0 Parts |
| (solvent, propylene glycol monomethyl ether acetate manufactured by Kyowa Hakko Chemical Co., Ltd.) | |

Preliminarily, the above compounds were uniformly dispersed using a dispersion stirrer and then finely dispersed using a nano mill to prepare a pigment base.

| | |
|---|---|
| Pigment base | 13.0 Parts |
| Acrylic resin A (containing a solvent component) | 35.0 Parts |
| PMA | 14.5 Parts |
| MBA | 37.5 Parts |
| (solvent, methoxybutyl acetate manufactured by Daicel Chemical Industries Ltd.) | |

As described above, an acrylic resin A and solvents PMA and MBA were added to a pigment base, followed by stirring using a dispersion stirrer and further filtration through a 1 micron filter to obtain an ink composition A for jet printer.

Ink characteristics such as viscosity, surface tension and mean particle size of a dispersion pigment of the resulting jet printing ink A are as follows.

| | |
|---|---|
| Viscosity (E type viscometer) | 10 mPa·s |
| Surface tension (Wilhelmy type surface tension meter) | 27 mN/m |
| Volume mean particle size (laser diffraction scattering type particle size distribution meter) | 220 nm |

Example 2

| | |
|---|---|
| FASTOGEN BLUE 5430SD | 25.8 parts |
| (blue pigment manufactured by Dainippon Ink and Chemicals, Inc.) | |
| ADISPER PB-821 | 7.7 parts |
| PMA | 66.5 parts |

Preliminarily, the above compounds were uniformly dispersed using a dispersion stirrer and then finely dispersed using a nano mill to prepare a pigment base.

| | |
|---|---|
| Pigment base | 17.0 parts |
| Acrylic resin B (containing a solvent component) | 26.6 Parts |
| PMA | 6.1 Parts |
| MBA | 50.3 Parts |

As described above, an acrylic resin B and solvents PMA and MBA were added to a pigment base, followed by stirring using a dispersion stirrer and further filtration through a 1 micron filter to obtain an ink composition B for jet printer.

Ink characteristics of the resulting ink composition B for jet printer are as follows.

| | |
|---|---|
| Viscosity (E type viscometer) | 9.7 mPa·s |
| Surface tension (Wilhelmy type surface tension meter) | 27 mN/m |
| Volume mean particle size (laser diffraction scattering type particle size distribution meter) | 134 nm |

Example 3

| | |
|---|---|
| MITSUBISHI CARBON BLACK #960 | 16.7 Parts |
| (carbon black manufactured by Mitsubishi Chemical Corporation) | |
| ADISPER PB-821 | 10.0 Parts |
| PMA | 73.3 Parts |

Preliminarily, the above compounds were uniformly dispersed using a dispersion stirrer and then finely dispersed using a nano mill to prepare a pigment base.

| | |
|---|---|
| Pigment base | 26.3 Parts |
| Acrylic resin C (containing a solvent component) | 22.6 Parts |
| PMA | 5.0 Parts |
| MBA | 46.1 Parts |

As described above, an acrylic resin C and solvents PMA and MBA were added to a pigment base, followed by stirring using a dispersion stirrer and further filtration through a 1 micron filter to obtain an ink composition C for jet printer.

Ink characteristics of the resulting jet printing ink C are as follows.

| | |
|---|---|
| Viscosity (E type viscometer) | 10 mPa·s |
| Surface tension (Wilhelmy type surface tension meter) | 28 mN/m |
| Volume mean particle size (laser diffraction scattering type particle size distribution meter) | 100 nm |

Example 4

| | |
|---|---|
| TSY-1 | 37.0 Parts |
| (yellow pigment manufactured by TODA PIGMENT CORP.) | |
| SOLSPERSE 37500 | 10.9 Parts |
| (dispersing agent manufactured by LUBRIZOL LIMITED) | |
| PMA | 52.1 Parts |

Preliminarily, the above compounds were uniformly dispersed using a dispersion stirrer and then finely dispersed using a nano mill to prepare a pigment base.

| | |
|---|---|
| Pigment base | 11.9 Parts |
| Acrylic resin D (containing a solvent component) | 34.7 Parts |
| PMA | 12.9 Parts |
| MBA | 40.5 Parts |

As described above, an acrylic resin D and solvents PMA and MBA were added to a pigment base, followed by stirring using a dispersion stirrer and further filtration through a 1 micron filter to obtain an ink composition D for jet printer.

Ink characteristics of the resulting jet printing ink D are as follows.

| | |
|---|---|
| Viscosity (E type viscometer) | 10 mPa·s |
| Surface tension (Wilhelmy type surface tension meter) | 27 mN/m |
| Volume mean particle size (laser diffraction scattering type particle size distribution meter) | 270 nm |

Comparative Example 1

| | |
|---|---|
| FASTOGEN BLUE 5430SD | 25.8 Parts |
| ADISPER PB-821 | 7.7 Parts |
| PMA | 66.5 Parts |

Preliminarily, the above compounds were uniformly dispersed using a dispersion stirrer and then finely dispersed using a nano mill to prepare a pigment base.

| | |
|---|---|
| Pigment base | 17.0 Parts |
| Acrylic resin E (containing a solvent component) | 26.1 Parts |
| PMA | 6.1 Parts |
| MBA | 50.8 Parts |

As described above, an acrylic resin A and solvents PMA and MBA were added to a pigment base, followed by stirring using a dispersion stirrer and further filtration through a 1 micron filter to obtain an ink composition E for jet printer.

Ink characteristics of the resulting jet printing ink E are as follows.

| | |
|---|---|
| Viscosity (E type viscometer) | 10 mPa·s |
| Surface tension (Wilhelmy type surface tension meter) | 27 mN/m |
| Volume mean particle size (laser diffraction scattering type particle size distribution meter) | 135 nm |

Comparative Example 2

| | |
|---|---|
| 100ED | 34.0 Parts |
| ADISPER PB-821 | 10.0 Parts |
| PMA | 56.0 Parts |

Preliminarily, the above compounds were uniformly dispersed using a dispersion stirrer and then finely dispersed using a nano mill to prepare a pigment base.

| | |
|---|---|
| Pigment base | 13.0 Parts |
| Acrylic resin F (containing a solvent component) | 36.0 Parts |
| PMA | 14.5 Parts |
| MBA | 36.5 Parts |

An acrylic resin F and solvents PMA and MBA were added to a pigment base, followed by stirring using a dispersion stirrer and further filtration through a 1 micron filter to obtain an ink composition F for jet printer.

Ink characteristics of the resulting jet printing ink F are as follows.

| | |
|---|---|
| Viscosity (E type viscometer) | 10 mPa·s |
| Surface tension (Wilhelmy type surface tension meter) | 27 mN/m |
| Volume mean particle size (laser diffraction scattering type particle size distribution meter) | 230 nm |

Comparative Example 3

| | |
|---|---|
| FASTOGEN BLUE 5430SD | 25.8 Parts |
| ADISPER PB-821 | 7.7 Parts |
| PMA | 66.5 Parts |

Preliminarily, the above compounds were uniformly dispersed using a dispersion stirrer and then finely dispersed using a nano mill to prepare a pigment base.

| | |
|---|---|
| Pigment base | 17.0 Parts |
| Acrylic resin G (containing a solvent component) | 27.0 Parts |
| PMA | 6.1 Parts |
| MBA (solvent, methoxybutyl acetate manufactured by Daicel Chemical Industries Ltd.) | 49.9 Parts |

As described above, an acrylic resin G and solvents PMA and MBA were added to a pigment base, followed by stirring using a dispersion stirrer and further filtration through a 1 micron filter to obtain an ink composition for jet printer G.

Ink characteristics of the resulting jet printing ink G are as follows.

| | |
|---|---|
| Viscosity (E type viscometer) | 10 mPa·s |
| Surface tension (Wilhelmy type surface tension meter) | 28 mN/m |
| Volume mean particle size (laser diffraction scattering type particle size distribution meter) | 140 nm |

Comparative Example 4

| | |
|---|---|
| MITSUBISHI CARBON BLACK #960 | 16.7 Parts |
| ADISPER PB-821 | 10.0 Parts |
| PMA | 73.3 Parts |

Preliminarily, the above compounds were uniformly dispersed using a dispersion stirrer and then finely dispersed using a nano mill to prepare a pigment base.

| | |
|---|---|
| Pigment base | 26.3 Parts |
| Acrylic resin H (containing a solvent component) | 23.0 Parts |

-continued

| | |
|---|---|
| PMA | 5.0 Parts |
| MBA | 45.7 Parts |

As described above, an acrylic resin H and solvents PMA and MBA were added to a pigment base, followed by stirring using a dispersion stirrer and further filtration through a 1 micron filter to obtain an ink composition H for jet printer.

Ink characteristics of the resulting jet printing ink H are as follows.

| | |
|---|---|
| Viscosity (E type viscometer) | 9.8 mPa·s |
| Surface tension (Wilhelmy type surface tension meter) | 28 mN/m |
| Volume mean particle size (laser diffraction scattering type particle size distribution meter) | 105 nm |

Compositions and characteristics of the inks prepared in the above Examples 1 to 4 and Comparative Examples 1 to 4 are summarized in the following tables.

TABLE 2

| | | Example 1 | Example 2 | Example 3 | Example 4 |
|---|---|---|---|---|---|
| Composition of ink | Name of ink | A | B | C | D |
| | Pigment | 100ED (Magenta) 4.4 Parts | FASTOGEN BLUE 5430SD 4.4 Parts | Carbon black #960 4.4 Parts | TSY-1 (Yellow) 4.4 Parts |
| | Dispersant | ADISPER PB821 1.3 Parts | PB821 1.3 Parts | PB821 2.6 Parts | SOLSPERSE 37500 1.3 Parts |
| | Resin (solid content) | Acrylic resin A 18.0 Parts | Acrylic resin B 13.5 Parts | Acrylic resin C 11.5 Parts | Acrylic resin D 18.0 Parts |
| | PMA | 21.8 Parts | 17.4 Parts | 24.4 Parts | 19.1 Parts |
| | BMA | 54.5 Parts | 63.4 Parts | 57.1 Parts | 57.2 Parts |
| Characteristics of ink | Viscosity | 10 mPa·s | 9.7 mPa·s | 10 mPa·s | 10 mPa·s |
| | Surface tension | 27 mN/m | 27 mN/m | 23 mN/m | 27 mN/m |
| | Mean particle size | 220 nm | 134 nm | 100 nm | 270 nm |

| | | Com. Ex. 1 | Com. Ex. 2 | Com. Ex. 3 | Com. Ex. 4 |
|---|---|---|---|---|---|
| Composition of ink | Name of ink | E | F | G | H |
| | Pigment | 5430SD (Blue) 4.4 Parts | 100ED (Magenta) 4.4 Parts | 5430SD (Blue) 4.4 Parts | Carbon black #960 4.4 Parts |
| | Dispersant | PB821 1.3 Parts | PB821 1.3 Parts | PB821 1.3 Parts | PB821 2.6 Parts |
| | Resin (solid content) | Acrylic resin E 13.5 Parts | BR87 (Acrylic resin) 18.0 Parts | BR113 (Acrylic resin) 13.5 Parts | VROH (Vinyl chloride acetate resin) 11.5 Parts |
| | PMA | 17.4 Parts | 21.8 Parts | 17.4 Parts | 24.3 Parts |
| | BMA | 63.4 Parts | 54.5 Parts | 63.4 Parts | 57.2 Parts |
| Characteristics of ink | Viscosity | 10 mPa·s | 10 mPa·s | 10 mPa·s | 9.8 mPa·s |
| | Surface tension | 27 mN/m | 27 mN/m | 28 mN/m | 28 mN/m |
| | Mean particle size | 135 nm | 230 nm | 140 nm | 105 nm |

(Weatherability and Durability Evaluation)

Using ink compositions A, B, C and D for jet printer (Examples 1 to 4) prepared corresponding to Examples 1 to 4 using an acrylic resin containing an imide (meth)acrylate having a cyclic imide group (ALLONIX M140), an ink composition E for jet printer (Comparative Example 1) prepared without using an imide (meth)acrylate having a cyclic imide group, ink compositions F and G for jet printer (Comparative Examples 2 and 3) prepared using a commercially available acrylic resin and an ink composition H for jet printer (Comparative Example 4) prepared using a vinyl chloride acetate resin, eight ink compositions in total, the following weatherability and durability evaluation was conducted.

On a PCM steel plate (manufactured by Nippon Fine Coatings Co., Ltd.), each of the above respective compositions was printed and then surface protective layer was formed using a clear coating material ("ZEOTECK ES-T MAT CLEAR" manufactured by Dainippon Ink and Chemicals, Inc., silicone acrylic emulsion coating material). To evaluate whether or not the resulting coated steel plate can be used in applications of outer wall, the coated steel plate as a test sample was subjected to a following cross-cut adhesion test, a coin sctratch test, a pencil strength test and a boiling water resistance test (80° C., 1 hour, 5 hours).

<Cross-Cut Adhesion Test>

A cross-cut adhesion test was conducted by a method in accordance with JIS K5600-5-6.

Evaluation: A coated steel plate as a test sample wherein the coating is cut by grid pattern is used. After the adhesion test, a test sample showing squares adhesion of 80/100 or more is rated "pass" because it can be put into practical use.

<Coin Sctratch Test>

Using an old 500 yen coin (non-milled), a test sample is sctratched. The sample is sctrached while reciprocating from the front side to the other side once under a load of about 1 kg.

Evaluation
Score
 5: No change on surface of coating film
 4: Slight change on surface of coating film
 3: Coating film scratched, but causes no peeling
 2: Coating film scratched, and causes slight peeling
 1: Coating film peeled off, and substrates exposed In accordance with the above evaluation criteria, the degree of scratching was evaluated by 5-rank criteria.

The test sample showing a score of 3 or more is rated "pass" and is in practice satisfactory.

<Pencil Hardness>

A pencil hardness test was conducted by a method in accordance with JIS K5600-5-4.

Evaluation: A test sample showing pencil hardness of H or more is rated "pass" and is in practice satisfactory.

<Boiling Water Resistance Test>

As a sample steel plate, a GALFAN steel plate manufactured by Nippon Fine Coatings Co., Ltd. was used. On this steel plate, each of ink compositions for jet printer A to H corresponding to Examples 1 to 4 and Comparative Examples 1 to 4 was applied and then ZEOTECK ES-T manufactured by Dainippon Ink and Chemicals, Inc. (water-based silicone acrylic emulsion) was applied thereon to obtain a sample steel plate for test.

The resulting sample steel plates were allowed to stand in hot water at 80° C. in accordance with JIS K5400-8-20 and, after 1 hour and 5 hours, the following characteristics were evaluated.

Evaluation 1. Appearance

5: Good (No change occurs when compared before and after test)→1: Poor (Blister, spitting on the surface of coating film and the like)

The state of the occurrence of appearance abnormality was evaluated by 5-rank criteria in accordance with JISK5600-8-2.

Since appearance abnormality on the surface occurs, sample steel plates with scores other than 5 are rated as "failure".

Evaluation 2. GR %: Gross Change Rate

Assuming that gross value is 100 before a test, a gross reduction rate after a test is evaluated. A test sample showing a gross reduction rate of 80% or more is rated "pass" and is in practice satisfactory.

Evaluation 3. Cross-Cut Adhesion

A test sample showing squares adhesion of 80/100 or more is rated "pass" and is in practice satisfactory.

The evaluation results are shown in Tables 3, 4 and 5 below.

TABLE 3

|  | Squares adhesion | Coin scratch | Pencil hardness |
| --- | --- | --- | --- |
| Example 1 | 100/100 | Score 5 | H |
| Example 2 | 100/100 | Score 5 | H |
| Example 3 | 100/100 | Score 5 | H |
| Example 4 | 100/100 | Score 5 | H |
| Com. Example 1 | 95/100 | Score 4 | F |
| Com. Example 2 | 100/100 | Score 4 | F |
| Com. Example 3 | 100/100 | Score 4 | F |
| Com. Example 4 | 100/100 | Score 5 | H |

TABLE 4

|  | Boiling water resistance 80° C., 1 hour | | | Boiling water resistance 80° C., 5 hours | | |
| --- | --- | --- | --- | --- | --- | --- |
|  | Appearance | GR % | Squares adhesion | Appearance | GR % | Squares adhesion |
| Example 1 | Score 5 | 97 | 100/100 | Score 5 | 95 | 97/100 |
| Example 2 | Score 5 | 115 | 100/100 | Score 5 | 123 | 100/100 |
| Example 3 | Score 5 | 87 | 100/100 | Score 5 | 111 | 100/100 |
| Example 4 | Score 5 | 105 | 100/100 | Score 5 | 110 | 96/100 |
| Com. Example 1 | Score 4 | 65 | 80/100 | Score 2 | 60 | 60/100 |
| Com. Example 2 | Score 3 | 80 | 80/100 | Score 2 | 60 | 55/100 |
| Com. Example 3 | Score 4 | 70 | 85/100 | Score 3 | 60 | 60/100 |
| Com. Example 4 | Score 3 | 70 | 80/100 | Score 2 | 50 | 50/100 |

A jet ink using an acrylic resin containing imide acrylate having a cyclic imide group was excellent in adhesion and boiling water resistance as compared with others.

Similar to the boiling water resistance test, each of ink compositions A, B, C and D for jet printing ink corresponding to Examples 1 to 4 was applied on a PCM steel plate and then a clear agent was overcoated to obtain samples. Weatherability of each of the resulting samples was evaluated by a super UV weatherometer. The results are shown in Table 5.

Apparatus: EYE SUPER UV Tester manufactured by IWASAKI ELECTRIC Co., Ltd.

Evaluation: Appearance

A sample causing no blister is rated "pass" (no abnormality).

Evaluation; GR %

A sample causing showing GR % of 80% or more is rated "pass".

TABLE 5

|  | S-UV 100 hours | | S-UV 300 hours | | S-UV 500 hours | |
| --- | --- | --- | --- | --- | --- | --- |
|  | Appearance | GR % | Appearance | GR % | Appearance | GR % |
| Example 1 | No abnormality | 98 | No abnormality | 111 | No abnormality | 98 |
| Example 2 | No abnormality | 89 | No abnormality | 96 | No abnormality | 110 |
| Example 3 | No abnormality | 92 | No abnormality | 121 | No abnormality | 86 |
| Example 4 | No abnormality | 95 | No abnormality | 98 | No abnormality | 98 |

It is considered that an acceleration test using a SUPER UV Tester of 50 hours corresponds to an outdoor exposure of one year, while an acceleration test using a SUPER UV Tester of 500 hours corresponds to an outdoor exposure of 10 years. Therefore, when samples A, B, C and D corresponding to Examples 1 to 4 are used as a siding used outdoors, it is assumed that no change occurs for about 10 years.

INDUSTRIAL APPLICABILITY

A ink composition for jet printer, which has stable dispersion stability and good ejection properties suited for use as an ink for jet printer, and also has sufficient weatherability and durability when used to form a pattern of a siding material for outer wall, and a siding for outer wall which is excellent in weatherability and durability and also has an excellent design pattern are provided by the present invention.

The invention claimed is:

1. A siding for outer wall, comprising
   a base material for siding, and
   an undercoating layer, a jet ink coating layer and a surface protective layer laminated in this order on the base material for siding, wherein
   the jet ink coating layer includes a pattern which is formed from an ink composition for a jet printer, wherein
   the ink composition comprises a pigment, a film forming resin and an organic solvent, the film forming resin is an acrylic copolymer which contains, as a monomer unit, at least one of compounds represented by the general formulas (1) and (2):

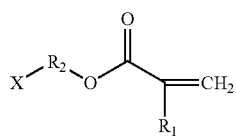

(1)

wherein $R_1$ represents a hydrogen atom or a methyl group; $R_2$ represents an alkylene group having 2 to 12 carbon atoms which may be linear or branched; and $R_3$ and $R_4$ each independently represents a hydrogen atom, an alkyl group, an alkenyl group or an aryl group, and the sum of the number of carbon atoms of $R_3$ and $R_4$ is from 4 to 12, or $R_3$ and $R_4$ form a saturated or unsaturated hydrocarbon group which is a five-membered ring formed by combination of the $R_3$ and $R_4$;

(2)

wherein $R_1$ represents a hydrogen atom or a methyl group; $R_2$ represents an alkylene group having 2 to 12 carbon atoms which may be linear or branched; and X represents a group selected from the group consisting of groups represented by the general formulas (3) to (6), (8) and (9); and

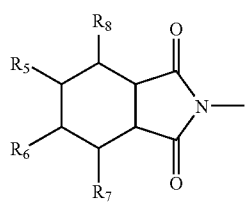

(3)

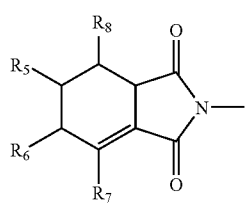

(4)

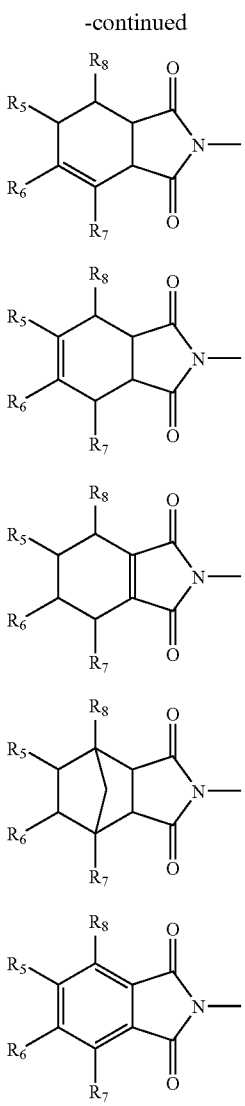

wherein $R_5$, $R_6$, $R_7$ and $R_8$ represent a hydrogen atom or an alkyl group having 1 to 6 carbon atoms: and the total amount of the compound represented by the general formula (1) and the compound represented by the general formula (2) is 10 to 50% by mass based on the entire monomer units of the acrylic copolymer included in the ink composition.

2. The siding for outer wall according to claim 1, wherein the acrylic copolymer contains only the compound represented by the general formula (2) among two compounds represented by the general formulas (1) and (2).

3. The siding for outer wall according to claim 1, wherein X of the compound represented by the general formula (2) is a group represented by the formula (3).

4. The siding for outer wall according to claim 1, wherein $R_5$, $R_6$, $R_7$ and $R_8$ represent a hydrogen atom or a methyl group.

5. The siding for outer wall according to claim 1, wherein the compound represented by the general formula (2) is hexahydrophthalimideethyl acrylate.

6. The siding for outer wall according to claim 1, wherein a weight average molecular weight of the acrylic copolymer is in the range of 5,000 to 300,000.

7. The siding for outer wall according to claim 1, wherein the X represents a group selected from the group consisting of groups represented by the general formulas (3) to (5) and (8).

8. The siding according to claim 1, wherein the total amount of the compound represented by the general formula (1) and the compound represented by the general formula (2) is from 15 to 45% by mass based on the entire monomer units of the acrylic copolymer.

9. The siding according to claim 1, wherein viscosity of the ink composition is from 2 to 20 mPa·s.

10. The siding according to claim 1, wherein surface tension of the ink composition is 20 to 40 dyn/cm.

11. The siding according to claim 1, wherein the content of the acrylic copolymer is 1 to 30% by mass based on the total amount of the ink composition.

12. The siding according to claim 1, wherein the ink composition consists essentially of the pigment, the film forming resin and the organic solvent.

13. The siding according to claim 1, wherein the ink composition consists essentially of the pigment, the film forming resin, the organic solvent and a dispersing agent.

14. The siding according to claim 1, wherein a molecular weight of the acrylic copolymer is from 10,000 to 60,000.

15. A siding for outer wall, comprising
a base material for siding, and
an undercoating layer, a jet ink coating layer and a surface protective layer laminated in this order on the base material for siding, wherein
the jet ink coating layer includes pattern which is formed from a ink composition for jet printer, wherein
the ink composition consists essentially of a pigment, a film forming resin and an organic solvent,
the film forming resin is an acrylic copolymer which contains, as a monomer unit, at least one of compounds represented by the general formulas (1) and (2):

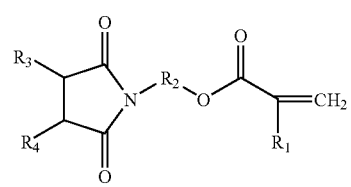

(1)

wherein $R_1$ represents a hydrogen atom or a methyl group; $R_2$ represents an alkylene group having 2 to 12 carbon atoms which may be linear or branched; and $R_3$ and $R_4$ each independently represents a hydrogen atom, an alkyl group, an alkenyl group or an aryl group, and the sum of the number of carbon atoms of $R_3$ and $R_4$ is from 4 to 12, or $R_3$ and $R_4$ form a saturated or unsaturated hydrocarbon group which is a five-membered ring formed by combination of the $R_3$ and $R_4$;

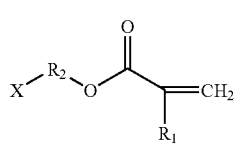

(2)

wherein $R_1$ represents a hydrogen atom or a methyl group; $R_2$ represents an alkylene group having 2 to 12 carbon atoms which may be linear or branched; and X represents a group selected from the group consisting of groups represented by the general formula (7); and

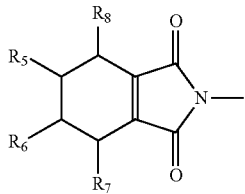
(7)

wherein $R_5$, $R_6$, $R_7$ and $R_8$ represent a hydrogen atom or an alkyl group having 1 to 6 carbon atoms:

and the total amount of the compound represented by the general formula (1) and the compound represented by the general formula (2) is 10 to 50% by mass based on the entire monomer units of the acrylic copolymer included in the ink composition.

16. The siding according to claim 15, wherein the ink composition further includes a dispersing agent.

17. The siding according to claim 15, wherein a molecular weight of the acrylic copolymer is from 5,000 to 300,000.

18. The siding according to claim 15, wherein a molecular weight of the acrylic copolymer is from 10,000 to 60,000.

* * * * *